United States Patent
Croak et al.

(10) Patent No.: US 8,681,633 B1
(45) Date of Patent: Mar. 25, 2014

(54) METHOD AND APPARATUS FOR MANAGING CALLS IN A PACKET NETWORK

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1372 days.

(21) Appl. No.: 11/098,815

(22) Filed: Apr. 5, 2005

(51) Int. Cl.
*G01R 31/08* (2006.01)

(52) U.S. Cl.
USPC .......................................................... 370/238

(58) Field of Classification Search
USPC ......... 370/352, 353, 238, 351, 252, 235, 229, 370/230, 254
See application file for complete search history.

(56) References Cited

U.S. PATENT DOCUMENTS

| | | | | |
|---|---|---|---|---|
| 6,078,652 A * | 6/2000 | Barak | ...................... | 379/114.02 |
| 6,282,192 B1 * | 8/2001 | Murphy et al. | ................ | 370/352 |
| 6,337,858 B1 * | 1/2002 | Petty et al. | ..................... | 370/356 |
| 6,956,820 B2 * | 10/2005 | Zhu et al. | .................... | 370/230.1 |
| 7,260,208 B2 * | 8/2007 | Cavalcanti | .............. | 379/221.01 |
| 7,394,803 B1 * | 7/2008 | Petit-Huguenin et al. | .... | 370/352 |
| 2003/0194077 A1 * | 10/2003 | Ramey | ..................... | 379/221.01 |
| 2006/0007915 A1 * | 1/2006 | Frame | .......................... | 370/352 |

* cited by examiner

*Primary Examiner* — Anh Ngoc Nguyen

(57) ABSTRACT

Method and apparatus for managing calls in a packet network is described. One aspect of the invention relates to a method of processing a call in a packet network in communication with a plurality of egress networks. A destination endpoint for the call is identified. Routing cost data associated with the plurality of egress networks is processed to identify an egress network of the plurality of egress networks providing a least cost route to the destination endpoint device. The call is routed towards the destination endpoint device through the identified egress network.

17 Claims, 4 Drawing Sheets

METHOD AND APPARATUS FOR MANAGING CALLS IN A PACKET NETWORK

BACKGROUND OF THE INVENTION

1. Field of the Invention

Embodiments of the present invention generally relate to telecommunications systems and, more particularly, to a method and apparatus for managing calls in a packet network.

2. Description of the Related Art

Generally, telecommunications systems provide the ability for two or more people or machines (e.g., computerized or other electronic devices) to communicate with each other. A telecommunications system may include various networks for facilitating communication that may be generally organized into packet networks and circuit-switched networks. An exemplary circuit-switched network includes a plain old telephone system (POTS), such as the publicly switched telephone network (PSTN). Exemplary packet networks include internet protocol (IP) networks, asynchronous transfer mode (ATM) networks, frame-relay networks, and the like. One type of packet network is a voice-over-internet protocol (VOIP) network.

In some instances, a subscriber to a VOIP network may initiate a call connection with a customer of another network that does not directly interface with the VOIP. In order to establish a communication channel, the VOIP network may route the call connection to the other network through one or more intervening networks, referred to as an "egress networks." The VOIP network typically does not exercise control over the egress networks. For example, the VOIP network does not control price charged for routing calls through the egress networks. In a VOIP network, it is desirable to terminate calls efficiently and with the least amount of cost to provide maximum potential to achieve high profit margins. Accordingly, there exists a need in the art for an improved method and apparatus for managing calls in a packet network.

SUMMARY OF THE INVENTION

Method and apparatus for managing calls in a packet network is described. One aspect of the invention relates to a method of processing a call in a packet network in communication with a plurality of egress networks. A destination endpoint for the call is identified. Routing cost data associated with the plurality of egress networks is processed to identify an egress network of the plurality of egress networks providing a least cost route to the destination endpoint device. The call is routed towards the destination endpoint device through the identified egress network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
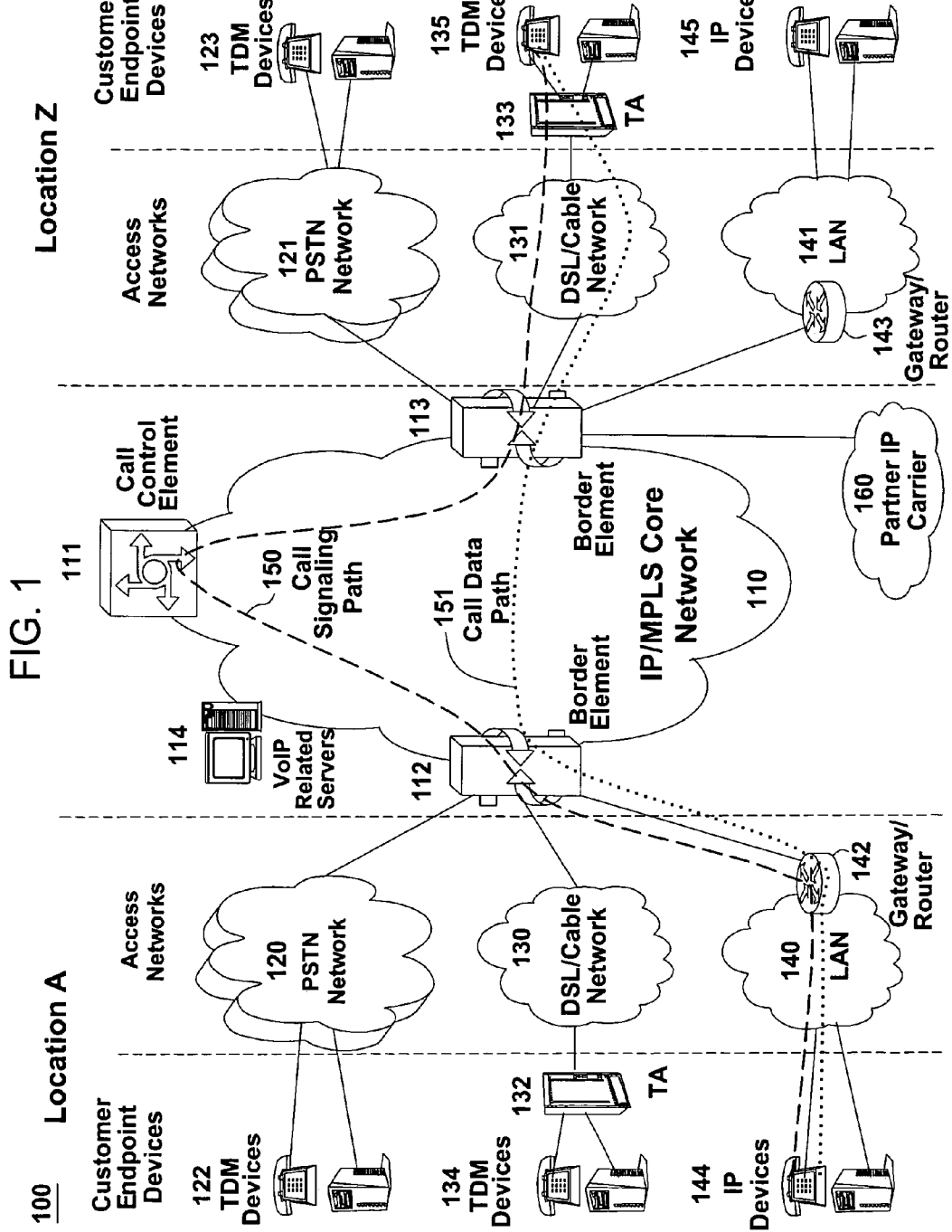
FIG. 1 is a block diagram depicting an exemplary embodiment of a communication system in accordance with the invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

Referring to FIG. 1, the customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. BEs may also be referred to as "edge components." A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
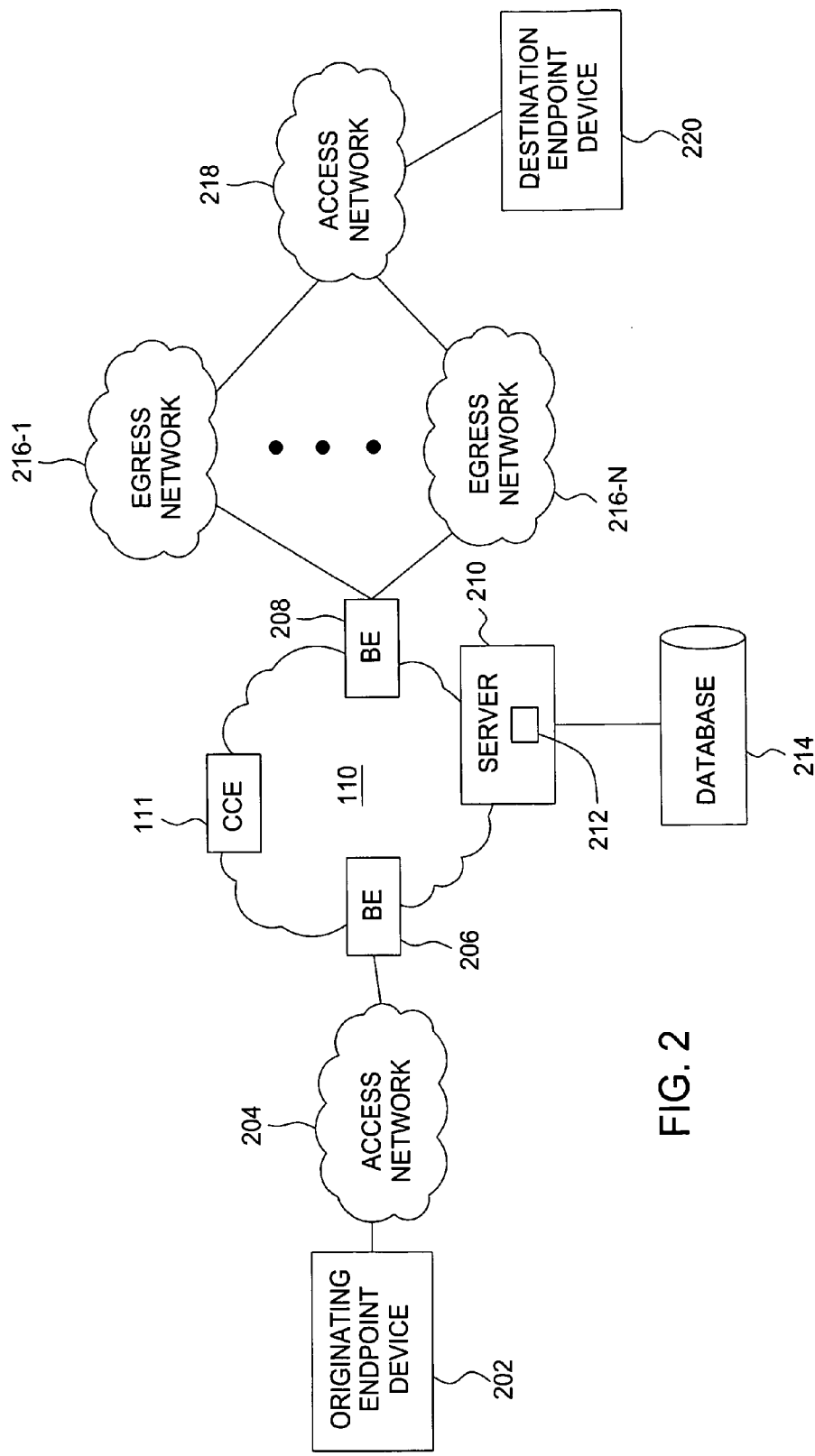
FIG. 2 is a block diagram depicting an exemplary configuration of the communication system of FIG. 1 constructed in accordance with the invention.

FIG. 2 is a block diagram depicting an exemplary configuration of the communication system of FIG. 1 constructed in accordance with the invention. In the present example, an originating endpoint device 202 is in communication with the core network 110 via an access network 204 and a border element (BE) 206. A destination endpoint device 220 is configured for communication with an access network 218. Egress networks 216-1 through 216-N (collectively referred to as egress networks 216), where N is an integer, provide communication paths between a BE 208 of the core network 110 and the access network 218. The originating endpoint device 202 and the destination endpoint device 220 may comprise any of the customer endpoint devices described above (e.g., TDM devices, IP devices, etc.). The access networks 204 and 218 may comprise any of the access networks described above (e.g., PSTN, DSL/Cable, LAN, etc). Each of the egress networks 216 may comprise any type of communication network known in the art, such as a packet network (e.g., VOIP, SOIP networks) or a circuit-switched network (e.g., PSTN). The egress networks 216 are not under control of the provider of the core network 110. Notably, the provider of the core network 110 does not exercise any direct control over the cost of routing a call through any of the egress networks 216. The egress networks 216 may include third party networks with respect to the core network 110, PSTN networks, or internet protocol (IP) peer networks with respect to the core network 110.

The core network 110 further includes a server 210 in communication with a database 214. The server 210 is configured to implement a network routing engine 212. In operation, the CCE 111 identifies the destination endpoint device 220 for a call request initiated by the originating endpoint device 202. The CCE 111 notifies the server 210 of the call request and requests a route for the call. The database 214 stores routing cost data comprising a set of routes through the egress networks 216, where each route has an associated cost. The routing cost data stored in the database 214 may be dependent on time (i.e., routing cost may change over time). For example, the cost to route a call over any of the egress networks 216 may change based on the time-of-day.

The network routing engine 212 queries the database 214 using the address of the destination endpoint device as parametric input and obtains a route exhibiting the least cost ("least cost route"). The network routing engine 212 may further use the time-of-day in the query if the routing cost data is dependent on time. That is, the network routing engine 212 uses the routing cost data stored in the database 214 to determine a path to the destination endpoint device 220 that exhibits the least cost to the service provider of the core network 110. In this manner, calls can be completed over third party networks, over the PSTN, and via IP peer networks, depending on the best cost arrangement at any given time.

Figure 3:
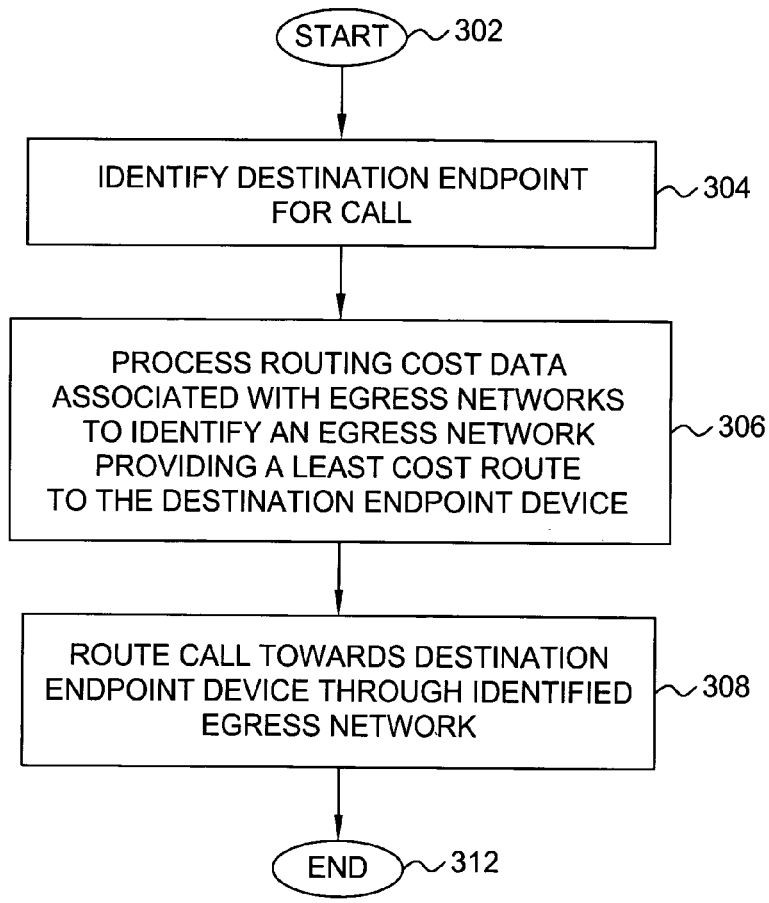
FIG. 3 is a flow diagram depicting an exemplary embodiment of a method for processing a call in a packet network in communication with a plurality of egress networks in accordance with one or more aspects of the invention.

FIG. 3 is a flow diagram depicting an exemplary embodiment of a method 300 for processing a call in a packet network in communication with a plurality of egress networks in accordance with one or more aspects of the invention. The method 300 begins at step 302. At step 304, a destination endpoint is identified for the call. At step 306, routing cost data associated with the egress networks is processed to identify an egress network that provides a least cost route to the destination endpoint device 220. At step 308, the call is routed towards the destination endpoint device through the identified egress network. The method 300 ends at step 310. The method 300 may be repeated for various call requests received by the packet network.

Figure 4:
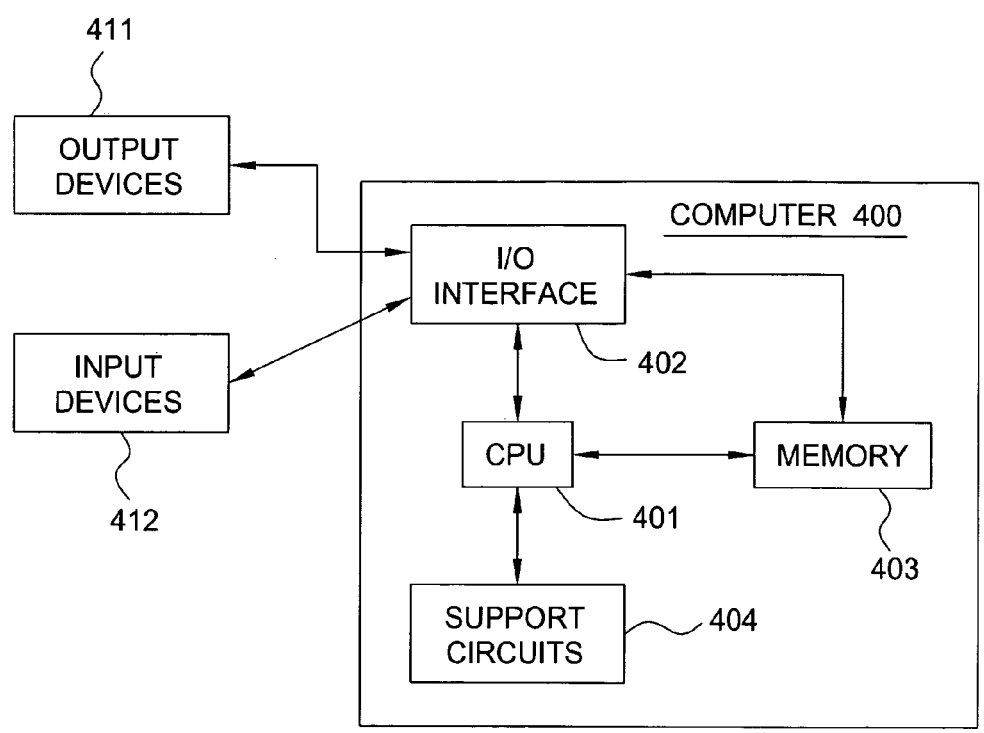
FIG. 4 is a block diagram depicting an exemplary embodiment of a computer suitable for implementing the processes and methods described herein.

FIG. 4 is a block diagram depicting an exemplary embodiment of a computer 400 suitable for implementing the processes and methods described herein. The computer 400 includes a central processing unit (CPU) 401, a memory 403, various support circuits 404, and an I/O interface 402. The CPU 401 may be any type of microprocessor known in the art. The support circuits 404 for the CPU 401 include conventional cache, power supplies, clock circuits, data registers, I/O interfaces, and the like. The I/O interface 402 may be directly coupled to the memory 403 or coupled through the CPU 401. The I/O interface 402 may be coupled to various input devices 412 and output devices 411, such as a conventional keyboard, mouse, printer, display, and the like.

The memory 403 may store all or portions of one or more programs and/or data to implement the processes and methods described herein. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 400 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 403. The memory 403 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. In a packet network in communication with a plurality of egress networks, a method of processing a call, comprising:
    receiving, via a processor of a network routing engine deployed within the packet network, an identification of a destination endpoint for the call;
    processing, via the processor, routing cost data associated with the plurality of egress networks to identify an egress network of the plurality of egress networks providing a least cost route to the destination endpoint, wherein each of the plurality of egress networks comprises an intervening network between the packet network and the destination endpoint, wherein each of the plurality of egress networks is a network that provides a communications path between the packet network and an access network associated with the destination endpoint; and
    forwarding, via the processor, a route having the egress network that is identified to a call control element for routing the call towards the destination endpoint through the packet network and the egress network that is identified.

2. The method of claim 1, wherein the routing cost data comprises a set of routes through the plurality of egress networks, each route in the set of routes having an associated cost.

3. The method of claim 1, wherein the routing cost data is stored in a database in communication with the network routing engine, and wherein the least cost route is obtained by querying the database using the destination endpoint as parametric input.

4. The method of claim 3, wherein the associated cost for each route in the set of routes changes dynamically over time, and wherein the database is further queried using a time-of-day as parametric input.

5. The method of claim 1, wherein the plurality of egress networks includes at least one of a third party network with respect to the packet network, a publicly switched telephone network, and an internet protocol peer network with respect to the packet network.

6. The method of claim 1, wherein the packet network comprises a voice-over-internet protocol network.

7. In a packet network in communication with a plurality of egress networks, an apparatus for processing a call, comprising:
    a processor of a network routing engine deployed within the packet network; and
    a non-transitory computer-readable medium storing a plurality of instructions which, when executed by the processor, cause the processor to perform operations, the operations comprising:
    receiving an identification of a destination endpoint for the call;
    processing routing cost data associated with the plurality of egress networks to identify an egress network of the plurality of egress networks providing a least cost route to the destination endpoint,
    wherein each of the plurality of egress networks comprises an intervening network between the packet network and the destination endpoint, wherein each of the plurality of egress networks is a network that provides a communications path between the packet network and an access network associated with the destination endpoint; and
    forwarding a route having the egress network that is identified to a call control element for routing the call towards the destination endpoint through the packet network and the egress network that is identified.

8. The apparatus of claim 7, wherein the routing cost data comprises a set of routes through the plurality of egress networks, each route in the set of routes having an associated cost.

9. The apparatus of claim 7, further comprising:
    storing the routing cost data in a database; and
    wherein the least cost route is obtained by querying the database using the destination endpoint as an parametric input.

10. The apparatus of claim 9, wherein the associated cost for each route in the set of routes changes over time, and wherein the database is further queried using a time-of-day as the parametric input.

11. The apparatus of claim 7, wherein the plurality of egress networks includes at least one of a third party network with respect to the packet network, a publicly switched telephone network, and an internet protocol peer network with respect to the packet network.

12. The apparatus of claim 7, wherein the packet network comprises a voice-over-internet protocol network.

13. A non-transitory computer readable medium storing a plurality of instructions which, when executed by a processor of a network routing engine deployed within a packet network in communication with a plurality of egress networks, causes the processor to perform operations of processing a call in the packet network, the operations comprising:

receiving an identification of a destination endpoint for the call;

processing routing cost data associated with the plurality of egress networks to identify an egress network of the plurality of egress networks providing a least cost route to the destination endpoint, wherein each of the plurality of egress networks comprises an intervening network between the packet network and the destination endpoint, wherein each of the plurality of egress networks is a network that provides a communications path between the packet network and an access network associated with the destination endpoint; and forwarding a route having the egress network that is identified to a call control element for routing the call towards the destination endpoint through the packet network and the egress network that is identified.

14. The non-transitory computer readable medium of claim 13, wherein the routing cost data comprises a set of routes through the plurality of egress networks, each route in the set of routes having an associated cost.

15. The non-transitory computer readable medium of claim 13, wherein the routing cost data is stored in a database in communication with the network routing engine, and wherein the least cost route is obtained by querying the database using the destination endpoint as parametric input.

16. The non-transitory computer readable medium of claim 15, wherein the associated cost for each route in the set of routes changes dynamically over time, and wherein the database is further queried using a time-of-day as parametric input.

17. The non-transitory computer readable medium of claim 13, wherein the plurality of egress networks includes at least one of a third party network with respect to the packet network, a publicly switched telephone network, and an internet protocol peer network with respect to the packet network.

* * * * *